March 3, 1953     H. L. MILLER     2,630,019
TORQUE TRANSMITTING APPARATUS
Filed Jan. 9, 1951     4 Sheets-Sheet 1
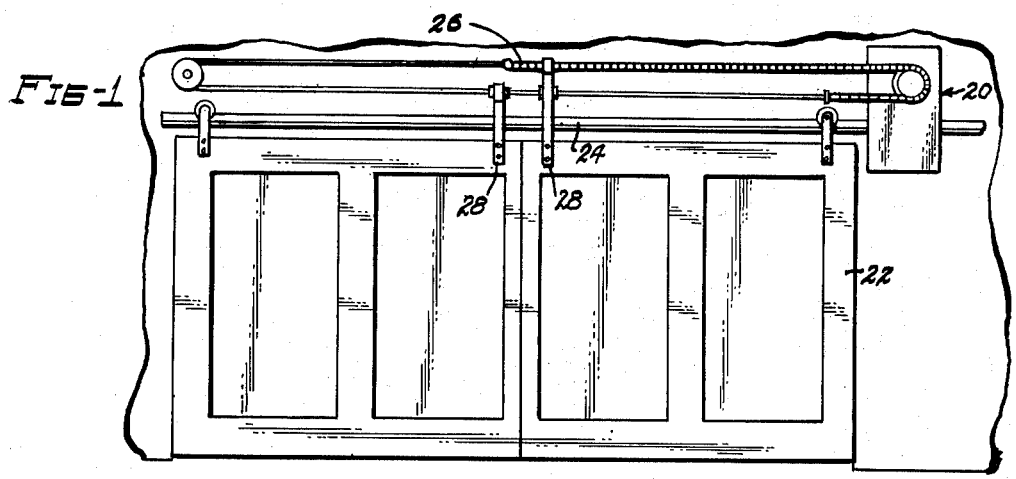
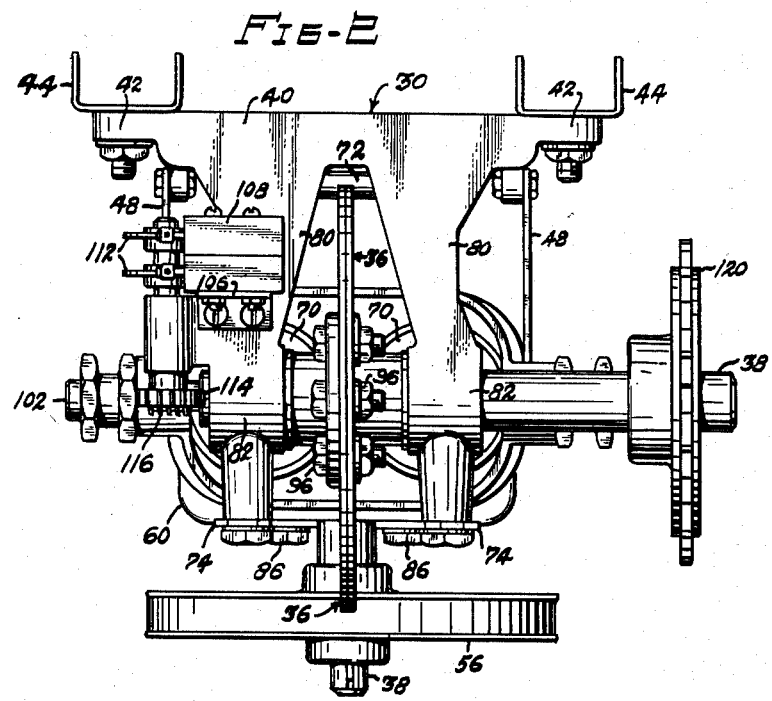
INVENTOR.
BY *Harold L. Miller*
*Wallace P. Lamb*
ATTORNEY March 3, 1953 H. L. MILLER 2,630,019
TORQUE TRANSMITTING APPARATUS
Filed Jan. 9, 1951 4 Sheets-Sheet 2

INVENTOR.
HAROLD L. MILLER
BY Wallace P. Lamb
ATTORNEY

March 3, 1953 H. L. MILLER 2,630,019
TORQUE TRANSMITTING APPARATUS
Filed Jan. 9, 1951 4 Sheets-Sheet 3

INVENTOR.
HAROLD L. MILLER
BY
Wallace P. Lamb
ATTORNEY

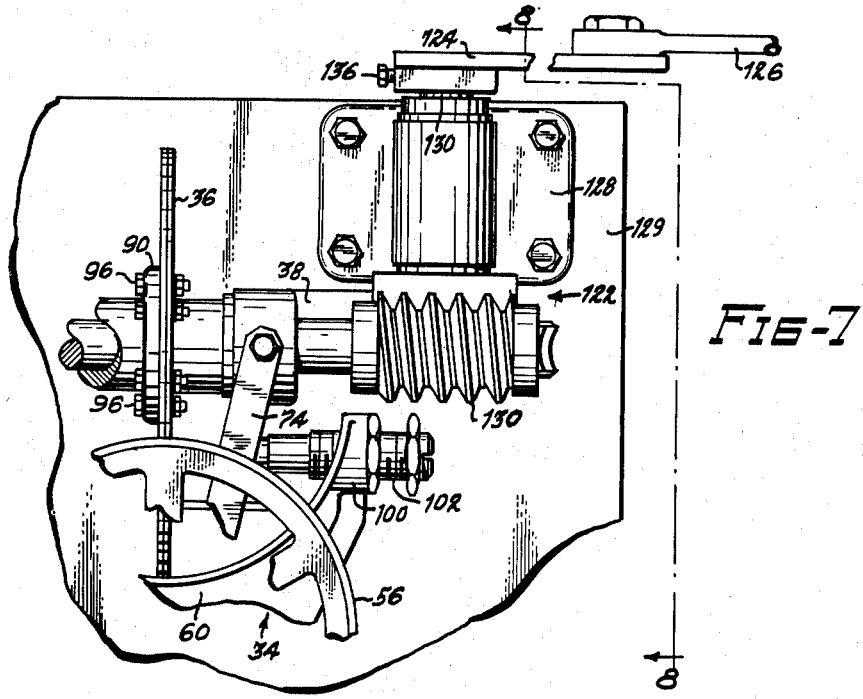
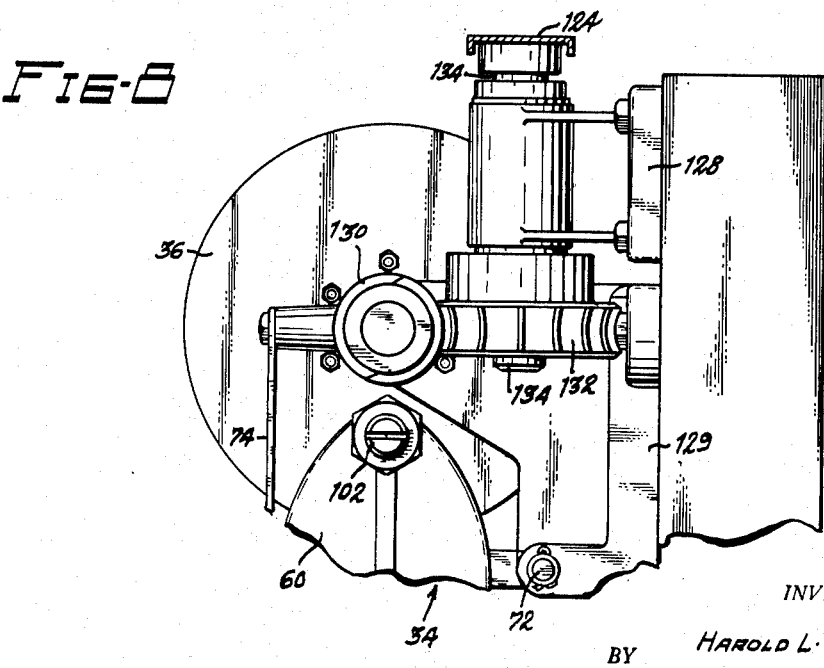

Patented Mar. 3, 1953

2,630,019

UNITED STATES PATENT OFFICE 2,630,019

TORQUE TRANSMITTING APPARATUS

Harold L. Miller, Grosse Pointe Park, Mich., assignor to Robot Appliances, Inc., a corporation of Michigan Application January 9, 1951, Serial No. 205,141

5 Claims. (Cl. 74—196)

This invention relates generally to torque transmitting apparatus and particularly to reversible door operating mechanism.

It is an object of the invention to provide an improved arrangement of operating apparatus units or devices to avoid any substantial load increase on the power device of the apparatus in the event an undue load is encountered, such as, for example, when a door operated by the apparatus strikes an obstacle.

Another object of the invention resides in the arrangement of the various apparatus devices including a slip friction drive device on the other side of a transmission device from the power device to attain a sensitive load balance condition.

Another object of the invention is to accomplish the above objects while at the same time provide for facilitation of assembly of the devices into an efficient reversible operating apparatus of reduced cost.

Another and more specific object of the invention resides in the compact arrangement of the operating devices including a readily removable speed reduction unit to facilitate assembly of the apparatus.

A further object of the invention resides in the support of the speed reduction device between a slip friction drive and a power device with the several devices compactly arranged in vertical alignment.

Other objects of the invention will become apparent from the following detailed description taken in connection with the accompanying drawings in which:

Fig. 1 is an elevational view of my operating apparatus showing as one application thereof, the operation of sliding doors;

Fig. 2 is a plan view of the operating apparatus;

Fig. 6 is a horizontal sectional view of the apparatus, taken along the line 6—6 of Fig. 4;

Fig. 7 is a fragmentary view of the apparatus showing its application to operation of swinging doors or gates; and Fig. 8 is a view taken in the direction of the arrows 8—8 of Fig. 7.

Figure 3:
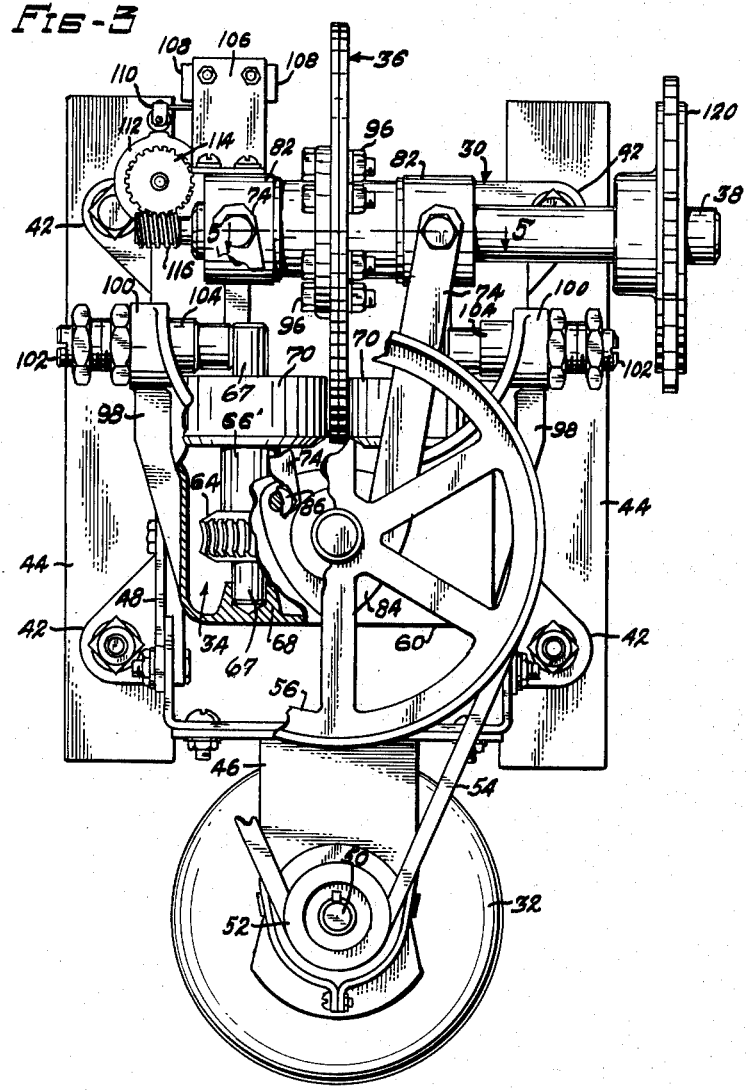
Fig. 3 is a side view of the operating apparatus with parts broken away and in section.

Referring to the drawings by characters of reference, in Fig. 1 my improved operating apparatus, designated in general by the numeral 20, is shown for purposes of illustrating its utility as adapted to operate or open and close a pair of sliding doors 22. The doors 22 may be suspended by rollers on a suitable horizontal track 24 which may be located above the door and be securely mounted on the adjacent wall of the building. A drive chain 26 is driven by the operating apparatus 20 and is attached by brackets 28 at suitable points to the door. It will be understood that the operating apparatus may be adapted to operate other types of doors, such as overhead doors, swinging doors, etc. and to operate other things, which are adapted to revolve, such as, radar antenna.

Referring now to the door operating apparatus 20, this apparatus comprises, in general, a main support or frame 30, power means or an electric motor 32, power transmission means or a speed reduction device 34, a slip drive device 36, and a driven shaft 38. Mounted on support 30, the other devices of the apparatus or devices 32, 34, 36 and 38 are vertically arranged in cooperative relationship having the driven shaft 38 spaced above the motor 32 and having the slip drive device 36 and speed reduction device 34 disposed between the motor and driven shaft. In accordance with my invention, I arrange the slip drive device 36 between the speed reduction device 34 and the driven shaft 38 so that substantially only the frictional force of the slip drive device is applied toward the force of the doors, or so that, in the event the doors strike an obstacle, only the frictional force of the slip drive device 36 need be overcome to effect slippage and discontinue movement of the doors. As shown in Fig. 1, the operating apparatus may be enclosed in a suitable casing 39 which may be box-shaped and be constructed of any suitable material.

The frame 30 may be a casting having a base or plate 40 for mounting on and flat against a wall or other support of a building. In the present construction, the frame casting 40 is formed with outwardly extending ears 42 which may be apertured to receive bolts or other securing means to secure the frame adjacent the top and bottom thereof to a pair of spaced mounting posts or channels 44. These mounting channels 44 may be suitably secured by screws or other means to a wall of a building adjacent the doors.

Any suitable, reversible type of electric motor may be used as the power means of the operating apparatus. It will be understood that the motor circuit may be controlled by suitable switches such as push-button switches to stop the motor and/or to reverse its direction of operation whereby to change direction of movement of the doors.

In order to obtain a compact apparatus, I support the electric motor 32 directly below the speed reduction device 34, and provide L-shaped end supports 46 which are suspended from extension brackets 48 that are secured to and extend laterally from the main frame 30. These parts may be screwed, bolted or be otherwise secured together and to the main frame 30. Projecting from one end of the motor casing, a motor drive shaft 50 carries a drive pulley 52, which through a belt drive 54 rotates a larger pulley 56 of the speed reduction device 34.

In addition to the pulley 56, the speed reduction device 34 comprises, in general, a support or casing 60, a worm gear 62, and a pair of worm wheels 64. As shown, the worm gear 62 is on and secured to a horizontal shaft 66 within casing 60 wherein the worm gear 62 extends between and meshes with both of the worm wheels 64. Projecting forwardly and externally of the casing 60 is an end portion 67 of the shaft 66 to which end portion the pulley 56 may be keyed or be otherwise attached for rotation of the shaft and pulley together. Preferably, the worm wheels 64 are respectively secured to spaced apart spindles 66' which are journaled respectively on a pair of vertical shafts 67. The shafts 67 have lower end portions retained in hollow upstanding bosses 68 which, as shown, may be formed integral of the bottom wall of casing 60.

The slip drive device 36 comprises a pair of driving rollers 70 and a driven disc 71. The drive rollers 70 are secured respectively to the spindles 66' adjacent the upper ends thereof and the driven disc 71 is secured to the driven shaft 38. As shown, the drive rollers 70 are arranged such that their peripheries engage opposite sides of the driven disc 71 to the end of rotating the driven shaft 38.

Further in accordance with my invention, I support the speed reduction device 34 as a unit on the main frame support 40 at the rear of casing 60 by a pin 72 and at the front of the casing by a pair of supports or straps 74. To this end, a pair of horizontally spaced lugs 76 integral of casing 60 are supported by pin 72 on similar lugs 78 which are integral with and project forwardly from the frame casting 30. Above the lugs 78, a pair of horizontally spaced vertical webs 80 of the frame extend forwardly therefrom to support aligning horizontally spaced bosses 82 wherein driven shaft 38 is journalled directly above the speed reduction device 34. To the bosses 82 are respectively secured the upper ends of the straps 74 which have their lower ends secured to the outer flanged end of a bearing 84 for the worm gear shaft 38. From the above description, it will be understood that the speed reduction device 34, including the pulley 56 and the drive rollers 70, may be assembled as a unit with the other devices of the apparatus and, conversely, may be readily removed as a unit.

The driven disc 71 is mounted on a hub 90 which may be held by a key, set screw or other means, to the driven shaft 38. Hub 90 is provided with a flange 94 to which the driven disc 71 may be secured by nuts and bolts 96, thus providing a driving connection from the disc through the hub 90 to shaft 38.

Formed on upstanding extensions 98 of the casing 60 are oppositely disposed bosses 100 to receive adjustment members 102 for respectively adjusting the pressure of the rollers 70 against opposite sides of the disc 71. The adjustment members 102 in the form of pins adjustably screw-thread into bushings 104 in the casting bosses 100. Inner ends of the adjustment pins 102 engage laterally against the upper ends of the roller shafts 66 which are made tiltable sufficiently to allow for pressure adjustment of the rollers against the friction disc 71.

On one of the webs 80 is secured a bracket 106 which supports a pair of limit switches 108. These switches, as is well known, are adapted to control the motor 32 so as to limit travel of the door in opposite directions. Since such switches are old in the art and do not enter into the present invention, they have not been shown in detail. In general, the limit switches 108 have operating arms 110 which, in the form of followers, are actuated by cams 112. These cams 112 are rotated by means of a worm wheel 114 which is driven from shaft 38 by a worm gear 116 thereon. On the other end of shaft 38 from the limit switches 108, a sprocket 120 may be provided for the chain 26 to move the door in opposite directions.

Referring now to the modification of Figs. 7 and 8, this apparatus is similar to the above described operator and therefore like parts have been designated by like numerals to avoid unnecessary repetitious description. The modified apparatus is adapted to operate such things as swinging doors, gates, radar antennae, etc. To this end, a gear mechanism 122 is operatively connected to the driven shaft 38 to operate a lever 124 which may be connected by a rod 126 to the door or other device to be operated.

Figure 5:
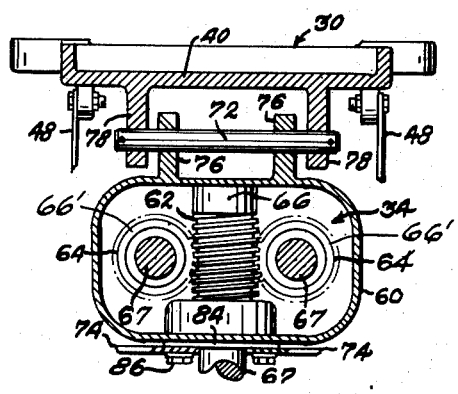
Fig. 5 is a horizontal sectional view of a detail of the operating apparatus, taken along the line 5—5 of Fig. 3.
Figure 4:
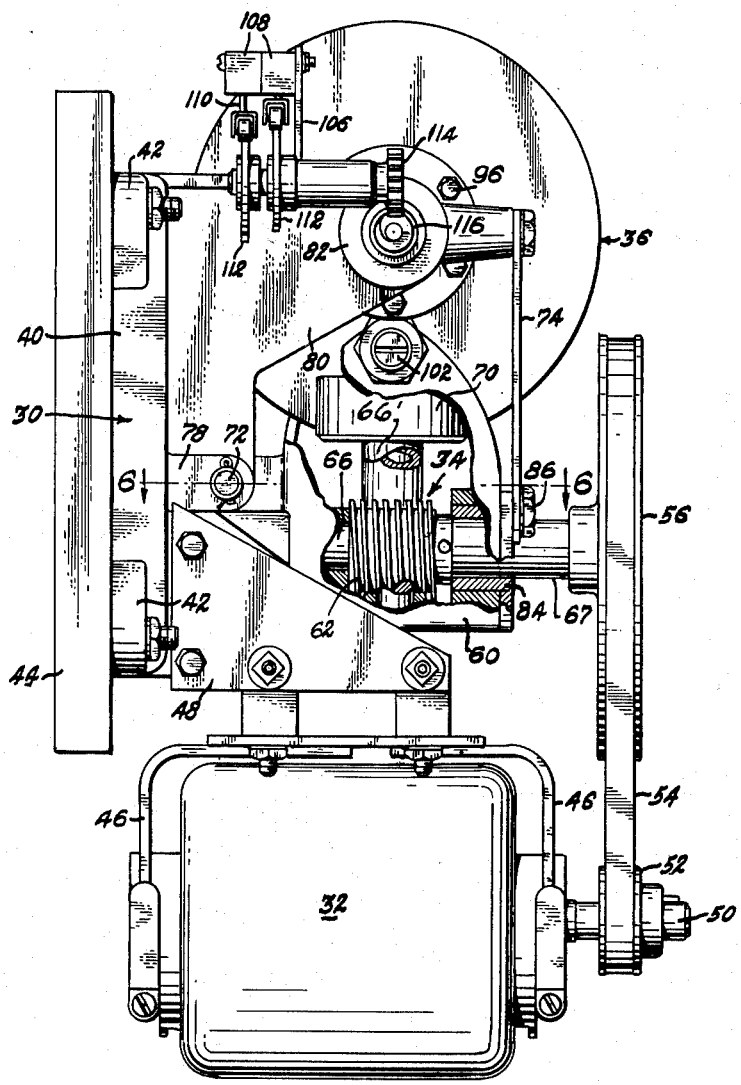
Fig. 4 is an end view of the operating apparatus having parts broken away and in section.
Figure 5:
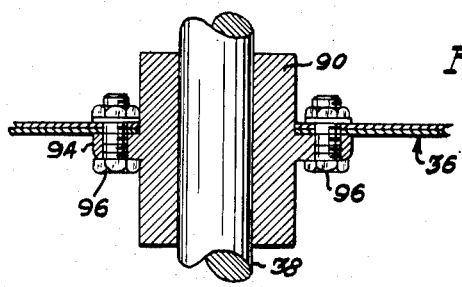

The gear mechanism 122 has a support or bracket 128 mounted on a main plate type support 129 which also supports the several units of the door operator. A worm gear 130 is keyed to the power take off end of the driven shaft 38, and drives a worm wheel 132 on a shaft 134. Shaft 134 extends upwardly from the worm gear 132 and is journaled in a bushing carried by bracket 128. Above the bracket 128, the operating arm 124 may be attached to shaft 134, such as by means of a set screw 136. As in the apparatus of Figs. 1 to 6 inclusive, the electric motor under control of suitable switches may be reversed to reverse the direction of rotation of the driven shaft 38. By this arrangement, a door, gate, revolving antennae or any other device connected to arm 124 may be rotated intermittently in reverse directions with safety and dependability.

From the foregoing description, it will be understood that I have provided improved operating apparatus comprising units or devices arranged to effect a sensitive adjustment of driving friction so that slippage will occur at the proper time and load to avoid injury to the apparatus or to a person in the event a door operated by the apparatus strikes a person or other obstacle. Further, it will be understood that I have provided an improved arrangement of a slip drive device between a driven shaft and a power transmission device whereby to reduce friction between the load and slip drive device over such arrangements where a slip clutch is located between the transmission and motor. In addition, it will be seen that I have provided an improved arrangement of devices to obtain a compact operating unit and to facilitate assembly of the devices into said compact unit.

While I have shown and described the invention in detail, and in connection with the opening and closing of doors, it will be understood that the invention is to be limited only by the spirit and scope of the appended claims as the operating apparatus may be used wherever a safe and dependable automatic, electrically operated power unit is desired for an operation requiring a reversing travel cycle, or intermittent cycle in one direction.

I claim:

1. Operating mechanism comprising, a support, a shaft bearing carried by said support, a driven shaft rotatably mounted on said bearing, a casing directly below said shaft, a horizontal pin between and attaching said casing to said support, speed reduction mechanism within said casing, power means supported by said support directly below said casing and operatively connected to said speed reduction mechanism, a pair of drive rollers operatively connected to said speed reduction mechanism within said casing, a driven disc on said driven shaft engaging and driven by said rollers, and a strap suspended from said shaft bearing supporting said casing on the other side thereof from said horizontal pin.

2. A mechanism of the character described comprising, a bearing support, a horizontal driven shaft rotatably mounted on said bearing support, a casing below said shaft, means on one side of said casing attaching said casing to said support, gear mechanism within said casing, power means supported by said support below said casing and operatively connected to said gear mechanism, a pair of drive rollers operatively connected to said gear mechanism, a driven disc on said driven shaft engaged and driven by said pair of drive rollers, and a hanger depending from said bearing support and supporting said casing on the other side thereof from said means.

3. A mechanism of the character described comprising, a support having a vertical leg and a pair of horizontally spaced bearing supports, a driven shaft rotatably mounted in said bearing supports, a driven disc secured to said driven shaft and disposed between said spaced bearing supports, a casing below said driven shaft open at the top to receive said driven disc, means attaching said casing at one side thereof to the vertical leg of said support, a pair of driving rollers within said casing engaging opposite faces of said driving disc, gear mechanism within said casing below and connected to said rollers, and a U-shaped hanger straddling said disc having ends connected respectively to said spaced bearing supports and secured to the other side of said casing to support the same.

4. A mechanism of the character described comprising, a support, a driven shaft rotatably mounted on said support, a driven disc secured to and rotatable with said driven shaft, a casing below and receiving an edge portion of said disc, a pair of driving rollers in said casing frictionally engaging and driving said disc, a shaft extending into said casing having an axis of rotation transverse to the axis of rotation of said rollers, gears within said casing operatively connecting said second-named shaft and said rollers together, a bearing member secured in and to a wall of said casing and receiving said second-named shaft, and a hanger depending from said support and supporting said bearing.

5. In a mechanism of the character described, a casing having a bottom wall, spaced bearings in said bottom wall, a pair of upright shafts having their lower ends respectively journaled in said bearings loosely to allow for canting of the shafts, a pair of rotatable spindles respectively mounted on said shafts, gears on said spindles, a roller on each of said spindles above said gear and below the upper ends of said shafts, said rolls being movable toward each other with said cantable shafts to engage frictionally with opposite side respectively of a driven disc, and a pair of adjustment members on said support respectively engaging the upper ends of said shafts laterally thereof to cant said shafts.

HAROLD L. MILLER.

REFERENCES CITED

The following references are of record in the file of this patent:

FOREIGN PATENTS

| Number | Country | Date |
|---|---|---|
| 888,135 | France | Feb. 15, 1943 |